United States Patent
Brown et al.

(10) Patent No.: US 7,068,679 B1
(45) Date of Patent: Jun. 27, 2006

(54) ASYNCHRONOUS PAYLOAD MAPPING USING DIRECT PHASE TRANSFER

(75) Inventors: Matthew D. Brown, Kinburn (CA); Colin G. Kelly, Ottawa (CA); Phil Campbell, Woodlawn (CA); Tony Bitzanis, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 954 days.

(21) Appl. No.: 09/612,976

(22) Filed: Jul. 10, 2000

(30) Foreign Application Priority Data

Dec. 29, 1999 (CA) .............................................. 2293521

(51) Int. Cl.
*H04J 3/16* (2006.01)
*H04J 3/22* (2006.01)

(52) U.S. Cl. .................. 370/468; 370/535; 370/536; 370/252; 370/232

(58) Field of Classification Search ................ 370/468, 370/535, 536, 537, 538, 252, 232, 254, 464, 370/465, 473, 474, 477, 505, 506, 539, 540–542
See application file for complete search history.

(56) References Cited

U.S. PATENT DOCUMENTS

| | | | | | |
|---|---|---|---|---|---|
| 5,142,529 | A | * | 8/1992 | Parruck et al. | 370/545 |
| 5,404,380 | A | * | 4/1995 | Powell et al. | 375/363 |
| 5,535,251 | A | | 7/1996 | Sugawara | 375/356 |
| 5,572,515 | A | * | 11/1996 | Williamson et al. | 370/252 |
| 5,841,760 | A | * | 11/1998 | Martin et al. | 370/242 |
| 6,580,731 | B1 | * | 6/2003 | Denton | 370/539 |

OTHER PUBLICATIONS

European Telecommunications Standard Institute, "Transmission and Multiplexing (TM); Synchronous Digital Hierarchy (SDH); Multiplexing Structure", Apr. 1997, pp. 1–17.

* cited by examiner

*Primary Examiner*—Wellington Chin
*Assistant Examiner*—Chuong Ho

(57) ABSTRACT

The present invention involves the passing of clock information from a point where a tributary payload is mapped into a carrier to a point where a tributary payload is de-mapped from the carrier. A synchronization signal is generated at the mapping end. Rather than sending clock phase information implicitly by means of the data, as is normally the case, a value of the synchronization signal at a given time, is sent explicitly, independent from the payload data.

19 Claims, 15 Drawing Sheets

| ROW # | COLUMN 2 | COLUMN 3 | COLUMN 4 |
|---|---|---|---|
| 1 | ACCYOFFH | ACCYOFFL | ACCYNOMH |
| 2 | ACCYOFFH | ACCYOFFL | ACCYNOML |
| 3 | ACCYOFFH | ACCYOFFL | ACCXH |
| 4 | ACCYOFFH | ACCYOFFL | ACCXL |
| 5 | ACCYOFFH | ACCYOFFL | ACCXCARRY |
| 6 | ACCYOFFH | ACCYOFFL | |
| 7 | ACCYOFFH | ACCYOFFL | |
| 8 | ACCYOFFH | ACCYOFFL | |
| 9 | ACCYOFFH | ACCYOFFL | |

FIG. 14

ASYNCHRONOUS PAYLOAD MAPPING USING DIRECT PHASE TRANSFER

FIELD OF THE INVENTION

The present invention relates to digital networks, more specifically to transfer of data through asynchronous mapping of data and regenerating the corresponding clock using directly transferred phase information.

BACKGROUND OF THE INVENTION

Where several low-speed data streams (tributaries) are to be sent on one high-speed data stream (carrier), there is a need for a multiplexer. A multiplexer serves the purpose, at a sending end, of arranging data from a number of tributaries into a single, complex signal that modifies a carrier wave. At the receiving end, the individual tributaries are regenerated into separate signals.

When data is transmitted using a bandwidth normally used for one telephone voice channel, a standard digital transmission rate may be used, called DS-0. Generically, digital signal X (DS-X) is a term for a series of standard digital transmission rate or levels based on DS-0, which has a transmission rate of 64 Kbps. Both the North American T-carrier system and the European E-carrier systems of transmission operate using the DS series as a base multiple. DS-0 is the base for the digital signal X series. DS-3, the signal in the T-3 carrier, carries a multiple of 28 DS-1 signals or 672 DS-0s and has a net rate of 44.736 Mbps.

Streams of digital data in communication systems are often broken up into "octets" which are sequences of eight bits, which may also be called bytes. The North American standard for digital networks that employ optical fiber is called synchronous optical network (SONET) while the European standard is called synchronous digital hierarchy (SDH). Both use octet multiplexing to create a higher-speed stream from lower-speed tributary signals.

In octet multiplexing successive time slots on the carrier are allocated to octets from different tributaries. In a SONET based transmission system, the output of the multiplexer may be a "Synchronous Transport Signal Level 1(STS-1)" signal with a basic bit rate of 51.84 Mbps. A standard STS-1 frame consists of 6480 bits or 810 octets and is 125 µs in duration. The time slots containing octets (or bytes) may be seen to be a frame organized in rows and columns, for STS-1 specifically, nine rows and 90 columns. Not all of an STS-1 frame is payload (corresponding to data from tributaries), as 36 octets (three columns) are reserved for overhead information used for such purposes as frame identification and monitoring of errors. The other 87 columns comprise a synchronous payload capacity. Into the capacity will be mapped an 87 column synchronous payload envelope (SPE). Typically, the SPE consists of one column of path overhead 86 columns of payload.

At a sending end, octets from a tributary are mapped into an SPE. Typically the clock of a mapping processor at the sending end is synchronous with the clock of the outgoing transport signal. Note that once an SPE has been mapped into an STS-1 frame, multiple STS-1 frames may be multiplexed together into a higher order signal, such as STS-3. At a receiving end, octets from a specific tributary are de-mapped from an SPE, received at a corresponding elastic store or FIFO (first in first out) buffer and then output from the buffer with timing from a clock local to the receiver. Typically the clock of de-mapping processor at the receiver is synchronous with the clock of the incoming transport signal. However, there may be transitions in the path between the sending end and the receiving end whereat one or more SPE's within STS-1 frames are passed to a new transport (STS-N). Unfortunately, the clocks at these transitions may not be synchronous. As a result of this asynchrony, the phase of a clock at the receiving end may be receding or advancing relative to the corresponding clock at the sending end.

One challenge is to regenerate the sending end clock from the de-mapped stream of data while minimizing jitter and wander (where wander may be considered a low frequency form of jitter). Methods for mapping one rate or format into another as well known. Specifications of methods for mapping the common asynchronous transmission formats (DS0, DS1, DS2, DS3, etc) into SONET are described in detail in "Synchronous Optical Network (SONET) Transport Systems: Common Generic Criteria, Technical Reference TR-NWT-000253, Issue 2 (Dec. 1991), Bell Communications Research, Inc." (the contents of which are incorporated herein by reference). Similar mapping methods are defined for the European Telecommunications Standardization Institute (ETSI) hierarchy mapping into SDH. Also, optical transmission equipment may map one proprietary format into another. For example, Nortel FD-565 (from Nortel Networks Corporation of Montreal, Canada) can carry a FD-135 proprietary format as well as the DS-3 standard format.

Specifically, for mapping DS-3 into STS-1 a mapping technique must be used that compensates for timing variations due to the asynchronous nature of the DS-3 signal. Usually an asynchronous stuffing bit is added in each SPE row while fixed stuffing bits are added to fill the STS-1 frame.

These methods are each optimized for the mapping of particular formats, and cannot be used to map rates that vary significantly from the standard. These mappings are also each precisely tuned for the particular format and bit-rate that is being mapped, plus or minus a tolerance such as 20 parts per million on the bit rate. A signal that has a bit rate even 1% different than that of a DS-3 may not be transported, using these methods, within SONET. A different hardware unit is generally required to perform the mapping of each format of signal. Thus the standards have allowed transportation of a very specific set of signals with format specific hardware.

When known mapping techniques are adapted to achieve low amounts of jitter at the far end, given that a clock is regenerated from the de-mapped stream of data, the jitter may approach the maximum spacing that occurs between data chunks (e.g., bits, bytes, etc.).

Rather than mapping to minimize jitter, an alternative solution is to filter the regenerated clock with a very low bandwidth phase locked loop (PLL). This requires a voltage controlled crystal oscillator (VCXO) based analog PLL or a crystal oscillator (XO) based, digitally controlled PLL, each of which introduce cost and complexity issues. Further, the low bandwidth associated with these solutions make addressing frequency steps, that may occur on the tributary signal, challenging. To accommodate this, a large FIFO is required, making implementation slightly more expensive and extending latency.

There remains a need for an efficient method for mapping, using inexpensive hardware, arbitrary signals into SONET (and other formats) such that the signals can be recovered with low timing jitter.

SUMMARY OF THE INVENTION

The present invention involves the passing of clock information from a point where a tributary payload is mapped into a carrier to a point where a tributary payload is de-mapped from the carrier. Rather than sending clock phase information implicity by means of the data, as is normally the case, clock information is sent explicitly, independent from the payload data. Also, the clock information is used when mapping the data into the payload area of a defined structure.

In accordance with an aspect of the present invention there is provided, at a near end of a transmission system, a method of mapping client data into an outgoing block, the outgoing block including payload words and overhead words, so as to transfer the client data and clock synchronization information associated with the client data to a far end of the transmission system. The method includes receiving client words of an incoming flow of the client data, generating fill words and mapping the payload words into the outgoing block, where each of a first plurality of the payload words comprises one of the client words and each of the second plurality of the payload words comprises one of the fill words. The method further includes adjusting a rate at which the client words are mapped such that an average number of the client words mapped is equal to an average number of the client words received, including an indication of the rate in the overhead words and mapping the overhead words into the outgoing block. In another aspect of the present invention a mapping processor is provided to carry out this method. In a further aspect of the present invention there is provided a software medium that permits a general purpose computer to carry out this method.

In accordance with another aspect of the present invention there is provided a method of regenerating a clock associated with a tributary signal, the method including generating a local synchronization signal, receiving a block of words, the block comprising overhead words and payload words, de-mapping, from the block, an overhead word including an offset indicator, altering the generating using the offset indicator to obtain an altered local synchronization signal and synthesizing the clock associated with the tributary signal using the altered local synchronization signal. In another aspect of the present invention a de-mapping processor is provided to carry out this method. In a further aspect of the present invention there is provided a software medium that permits a general purpose computer to carry out this method.

In accordance with a further aspect of the present invention there is provided a computer data signal embodied in a carrier wave including words from a flow of data received at a mapping processor and a value of a synchronization signal generated at the mapping processor.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention;

FIG. 14 is a schematic illustration of a mapping of information into overhead fields of the payload envelope of FIG. 5 in accordance with an embodiment of the present invention.

DETAILED DESCRIPTION OF THE PREFERRED EMBODIMENTS

Figure 1:
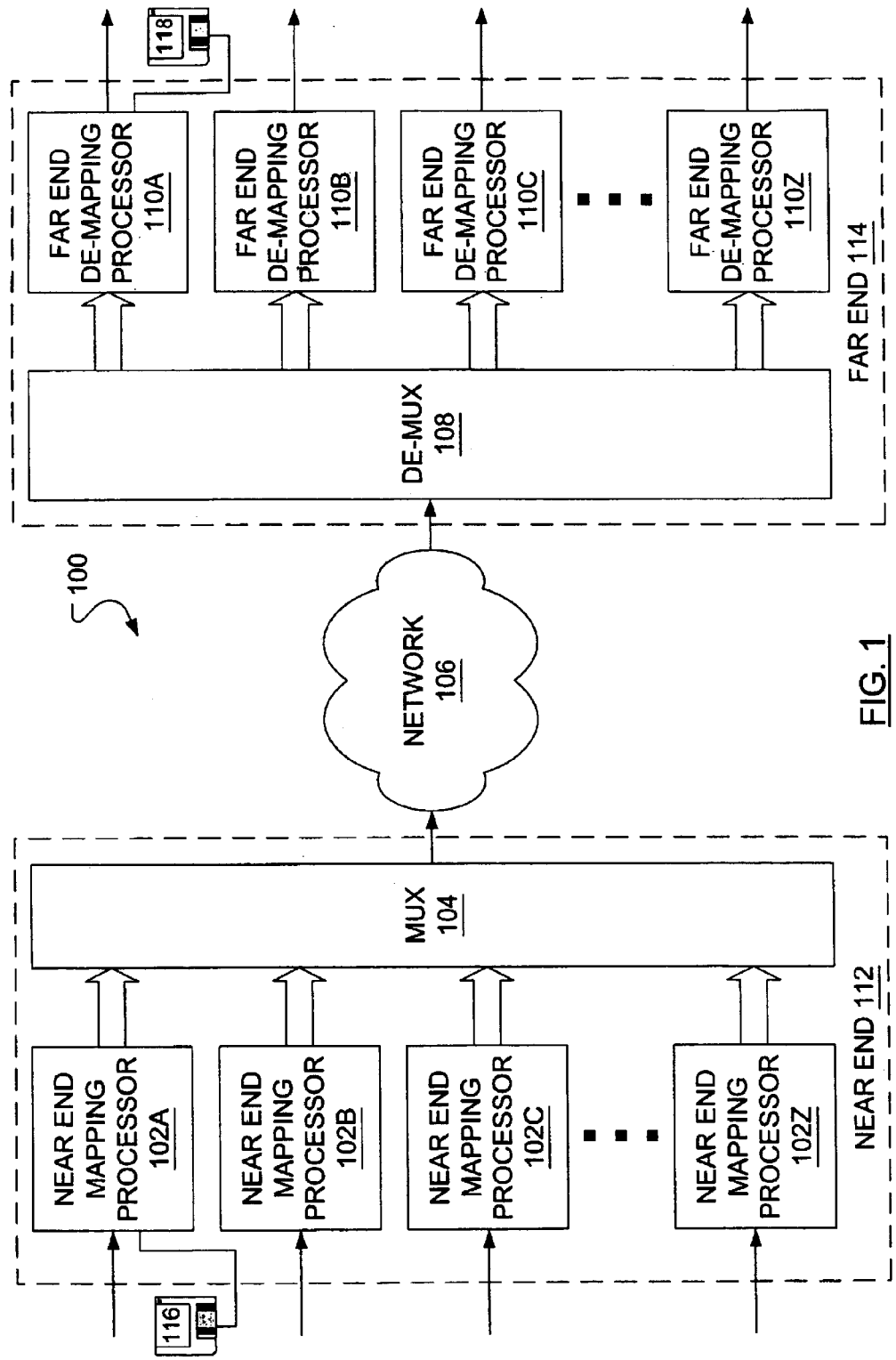
FIG. 1 is a schematic illustration of a multiplexed network.

Referencing FIG. 1, a multiplexed network 100 is illustrated. At a near end 112, a number of discrete signals, each carrying a stream of bits (tributary or client data), are processed by a group of near end mapping processors 102A, 102B, 102C . . . 102Z. Data from each tributary is multiplexed into a single stream of bits (carrier), by a multiplexer (MUX) 104, and the single stream is sent over a network 106 to a far end 114. A de-multiplexer (DE-MUX) 108, at far end 114, separates out the data specific to each tributary and passes each data tributary to a group of far end de-mapping processors 110A, 110B, 110C . . . 110Z from which optional signals, each carrying a tributary stream of bits, are output. Note that network 106 could be any network that carries a signal synchronously from one point to another, including SONET, SDH and PDH (plesiochronous digital hierarchy, i.e. almost synchronous). It may also be a direct connection between two points.

Exemplary processors 102A, 110A may be programmable logic such as a field programmable gate array (FPGA), a programmable logic device (PLD) or a fixed implementation such as an Application Specific Integrated Circuit (ASIC) or an analog circuit. Alternatively, exemplary near end mapping processor 102A may be loaded with software for executing a mapping method in accordance with an embodiment of this invention from software medium 116. Similarly, exemplary far end de-mapping processor 110A may be loaded with software for executing a clock regeneration method in accordance with an embodiment of this invention from software medium 118. Software media 116, 118 could be disk, tape, chip or random access memory containing a file downloaded from a local or remote source.

Figure 2:
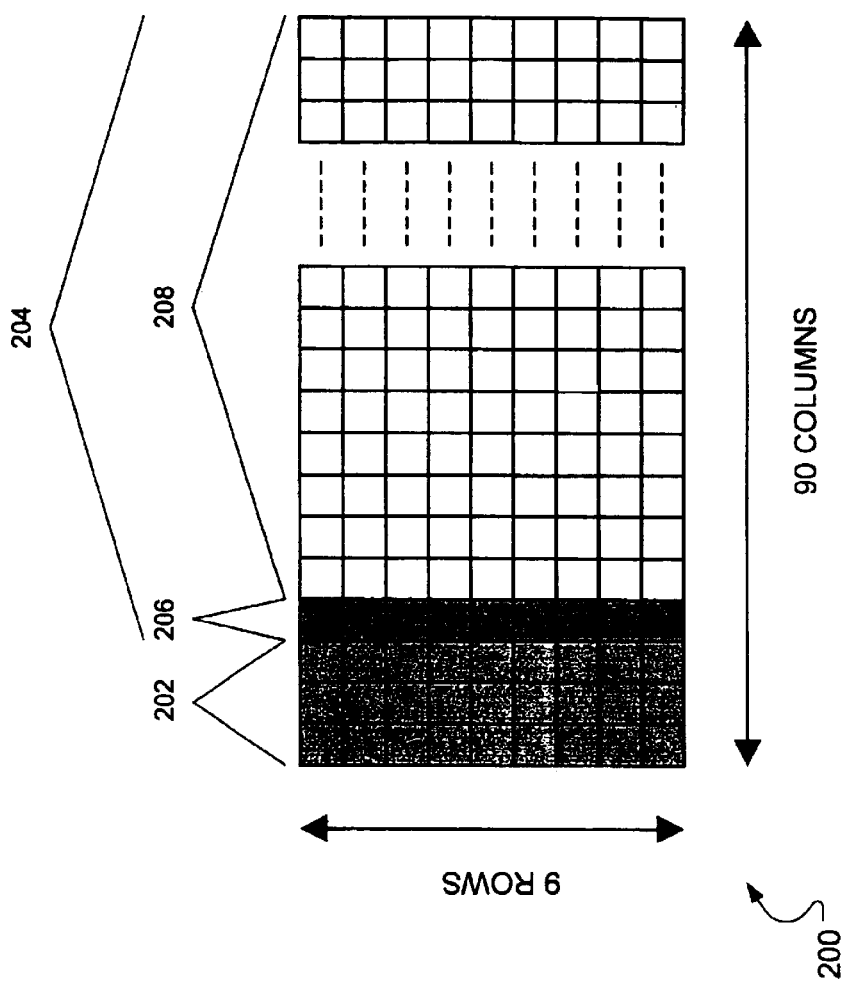
FIG. 2 is a diagrammatic illustration of the structure of an STS-1 frame.

FIG. 2 illustrates the structure of an STS-1 frame 200 wherein transport overhead 202 is identified as well as payload capacity 204. An SPE is shown in payload capacity 204, including a path overhead column 206 and 86 columns of payload 208. Note that, although the SPE is shown with an origin at the first column of the first row of payload capacity 204, the SPE may have an origin arbitrary placed within STS-1 frame 200, with the SPE origin noted with transport overhead 202.

At a far end, the timing of the output data stream of each tributary is not determined directly from the timing of the carrier signal from which it is de-multiplexed. Rather, signal processing performed at a near end employing the present invention involves including clock information (frequency and phase) in the data that is multiplexed and sent over the network. Processing performed at a far end employing the present invention extracts the included clock information to output a stream of bits with timing much closer to that of the original tributary clock than that available using known methods.

Consider a single tributary. Tributary data is mapped by a near end mapping processor 102 (FIG. 1) into a block of data which includes information (overhead) about the data in the block. A block of data may be an SPE or several blocks may fit into an SPE. The present invention makes use of the system clock at the near end and at the far end. It is initially assumed, as is typically the case, that these system clocks have similar frequencies, which frequencies are higher than the frequency of the tributary clock. At the near end, for each tributary, the serial data from the tributary is converted to parallel data and the tributary clock is commensurately stepped-down. A clock, used as a trimming signal to map tributary data into an outgoing block, is synthesized at the near end based on the system clock stepped down by an accumulator, i.e. the synthesized clock begins a new period at each carry of the accumulator. The nominal carry rate is determined by a selection of the size (M bits) of the accumulator and a number ($Y_{NOM}$). M and $Y_{NOM}$ are selected so that the average or mean rate at which tributary (client) data arrives at near end mapping processor 102 (FIG. 1) approximate the rate at which tributary (client) data is mapped into an outgoing block, despite the intermittent mapping of block overhead. The two rates are monitored to obtain frequency offset information ($Y_{OFF}$) which is used to exact the approximation. Since the far end has a similar system clock, $Y_{NOM}$ may be sent (i.e. included in block overhead) so that a clock may be synthesized (using a M bit accumulator) at the far end to recreate the synthesized clock of the near end. A frequency offset indicator ($Y_{OFF}$) is sent to maintain the accuracy of the recreation. The recreated synthesized clock may then be used to obtain an exact stepped-down tributary clock and, consequently, an exact tributary clock.

As phase and frequency errors may occur between the clock generators at the near end far ends, a synchronization indicator may also be included in the block overhead, the synchronization indicator taking the value of the near end accumulator at a specific position in the frame. The value of the far end accumulator at the specific position in the frame may be compared to the synchronization indicator to give a difference value, and corrections made to the far end accumulator as necessary. So that a transmission error does not result in the far end accumulator being unduly corrected, corrections to the far end accumulator may be delayed until consecutive difference values are equal. Thus indicating a consistent difference between the near end accumulator and the far end accumulator.

Further refinements may be required in view of pointer adjustments, as described hereinafter.

Figure 3:
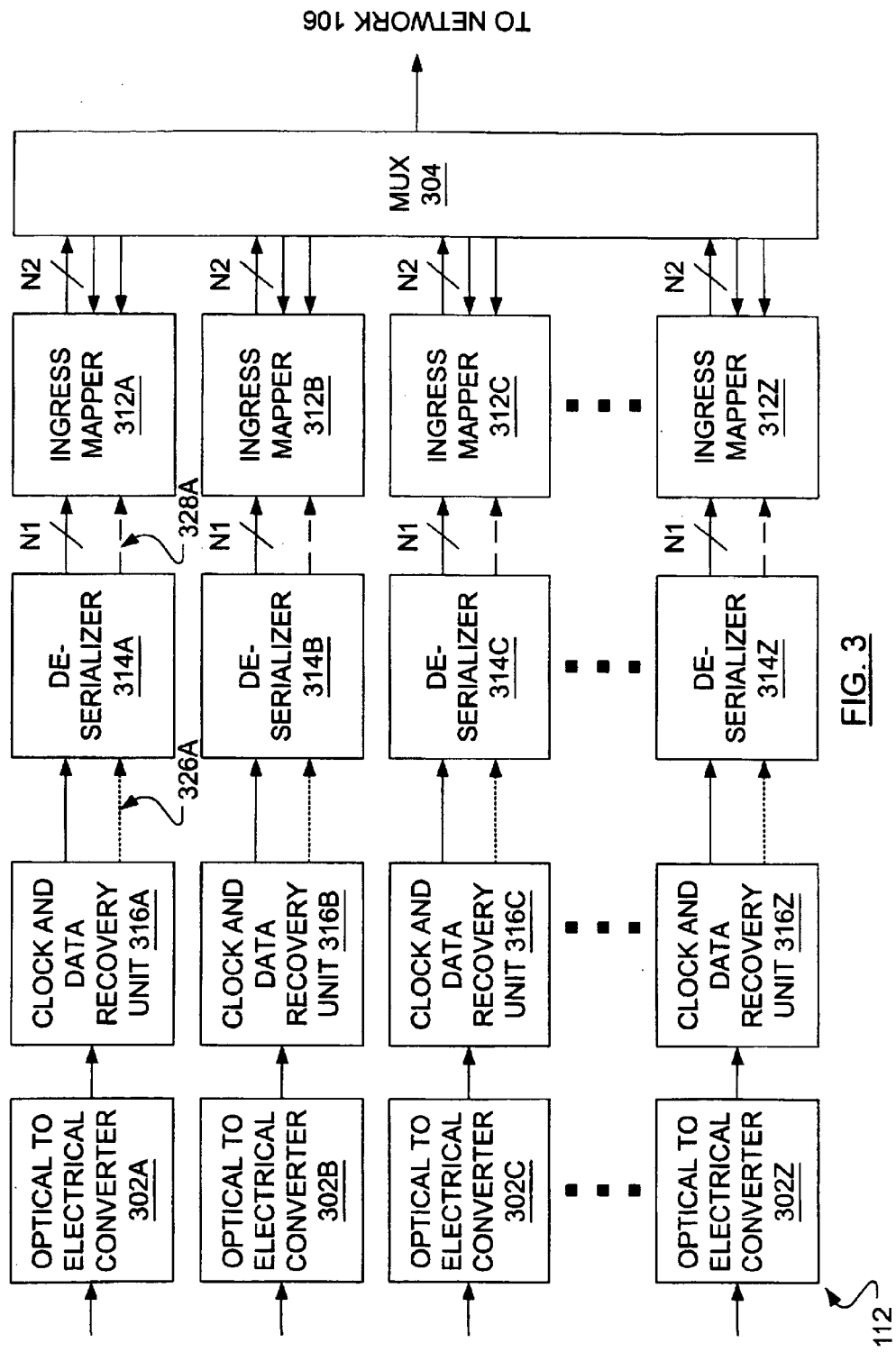
FIG. 3 is a schematic illustration of the near end of the multiplexed network of FIG. 1.

In FIG. 3, as in subsequent FIGS., components like those in previous FIGS. have like reference numerals. Each parallel connection (i.e., N-bit bus) between components is associated herein with a symbol indicating a number of bits. In many practical cases, the number of bits carried by each parallel connection will be eight and this value will be used to facilitate understanding of the examples. As it may not necessarily be the case that a parallel connection carries eight bits, each such connection has been labeled individually (N1, N2, N3 . . . ) and it will be understood that individual parallel connections may carry different numbers of bits. Further, some connections may be serial rather than parallel, obviating the need for serializers and de-serializers. Connections that pass a clock signal from one component to another are presented herein as dashed lines.

FIG. 3 illustrates near end 112 of multiplexed network 100 (FIG. 1). As in a typical multiplexed network, an optical signal, which transmits data serially, is input to one of a group of optical to electrical converters 302A, 302B, 302C . . . 302Z. The electrical data signals at the output of each converter are input to a corresponding clock and data recovery unit 316A, 316B, 316C . . . 316Z at which a tributary clock is determined from the data signal. Note that, in some cases, the input signal to near end mapping processor 102 (FIG. 1) will be electrical, rather than optical, and the need for optical to electrical converter 302 will be obviated. Each clock and data recovery unit outputs both tributary clock and tributary data to a corresponding de-serializer 314A, 314B, 314C . . . 314Z. Tributary data that is received one bit at a time, with timing defined by tributary clock 362A, at an input to de-serializer 314A, for instance, is output in parallel, for instance eight bits at a time, at a rate eight times slower than the input data stream, along with a stepped-down clock signal 328A which completes one cycle for every eight cycles completed on tributary clock 326A. The output (clock and data) of each de-serializer 314A, 314B, 314C . . . 314Z is received by an ingress mapper 312A, 312B, 312C . . . 312Z. An exemplary ingress mapper 312A receives stepped-down clock signal 328A along with data words and outputs words to a MUX 304 when permitted or enabled to do so by MUX 304. The output words are used by MUX 304 to create a frame of data according to a protocol for doing so. Output from ingress mapper 312A, for instance, includes block overhead (data specific to the tributary data and information about stepped-down clock 328A) and payload (tributary or client data and fill). MUX 304 adds overhead information to interleaved output from each ingress mapper 312A, 312B, 312C . . . 312Z to form a frame of data. The frame is then transmitted over network 106 (FIG. 1).

Figure 4:
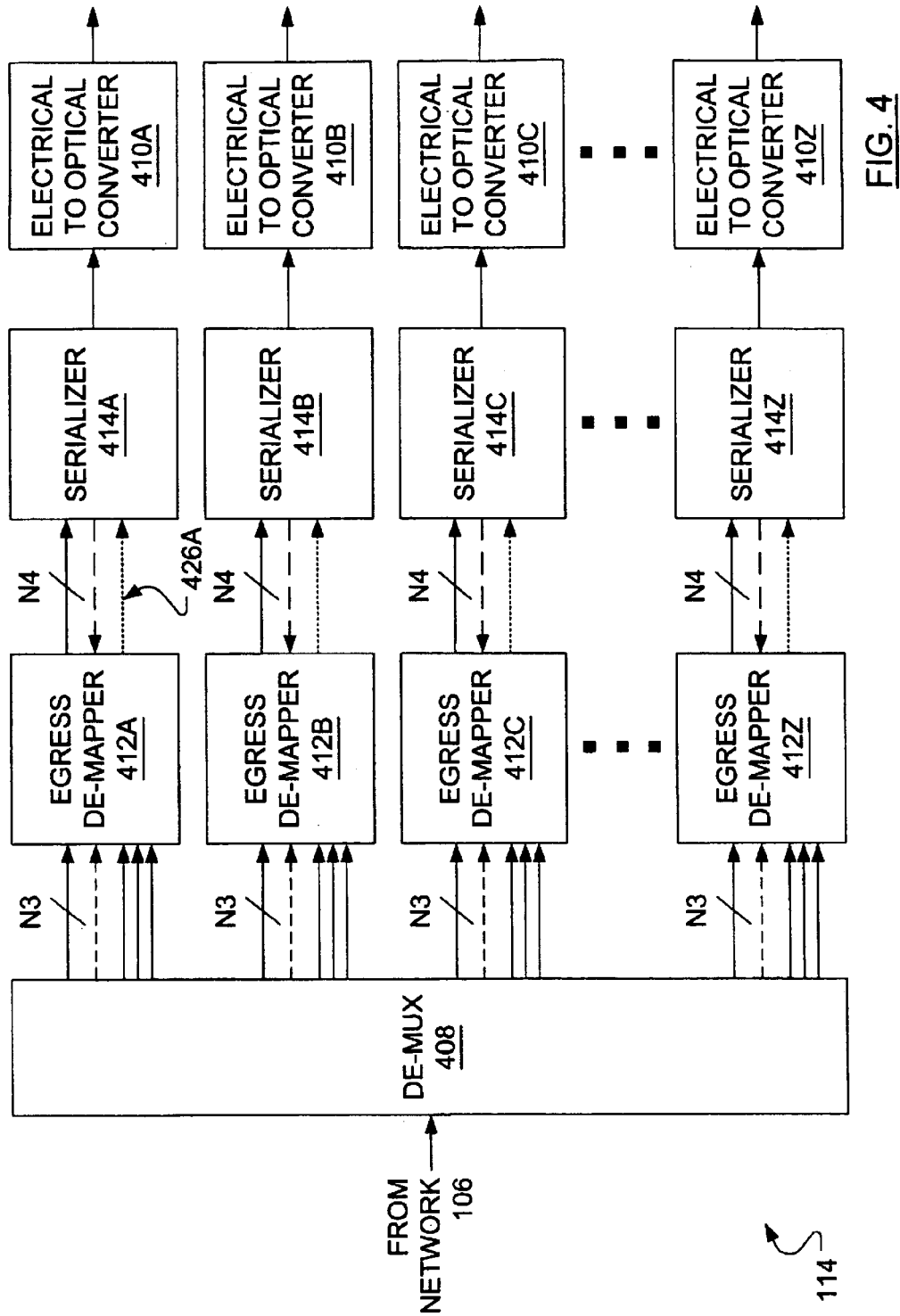
FIG. 4 is a schematic illustration of the far end of the multiplexed network of FIG. 1.

Turning to FIG. 4, illustrating far end 114 of multiplexed network 100 (FIG. 1), a DE-MUX 408, receives frames transmitted over network 106 by near end 112. DE-MUX 408 separates payload envelopes specific to each tributary and forwards the payload envelopes to a corresponding egress de-mapper 412A, 412B, 412C . . . 412Z. Payload envelopes received by an exemplary egress de-mapper 412A are processed to determine which words are block overhead data (including clock information) and which words are payload. The clock information is used to synthesize a clock with essentially the same frequency and phase as the tributary clock of the original tributary data. For this example, synthesized clock 426A approximates tributary clock 326A (FIG. 3) that was determined by clock and data recovery unit 316A (FIG. 3). The synthesized clock is output from egress de-mapper 412A, 412B, 412C . . . 412Z to a corresponding serializer 414A, 414B, 414C . . . 414Z. Serializer 414A, for example, uses the synthesized clock to generate a synthesized stepped-down clock at a rate eight times slower for passing back to egress de-mapper 412A where it is used to time the output, to serializer 414A, of words of tributary data. Tributary data is then passed bit-by-bit, from serializer 414A, 414B, 414C . . . 414Z to a corresponding electrical to optical converter 410A, 410B, 410C . . . 410Z, with timing gleaned from the synthesized clock. Each electrical to optical converter 410A, 410B, 410C . . . 410Z outputs an optical signal modulated by the tributary data received (electrically) from a corresponding serializer. Note that, in some cases, the preferred output signal from far end mapping processor 110 (FIG. 1) will be electrical, rather than optical, and the need for electrical to optical converter 410 will be obviated. For reasons described hereinafter, in addition to data words, exemplary egress de-mapper 412A receives from DE-MUX 408 a word extraction opportunity signal, in SPE start signal, frame position information and two pointer adjustment (PA) signals, one for positive adjustments and one for negative adjustments.

Figure 5:
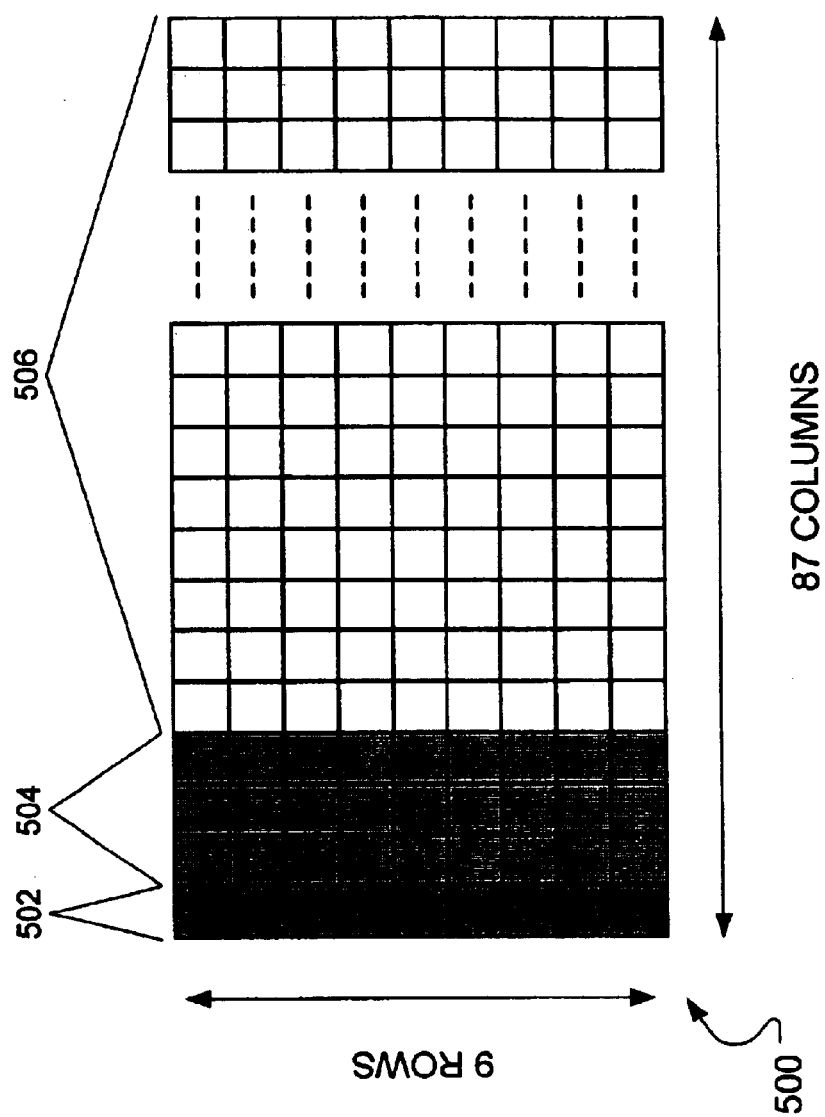
FIG. 5 is a diagrammatic illustration of the structure of a payload envelope generated in accordance with an embodiment of the present invention.

The structure of an exemplary SPE generated in accordance with an embodiment of the present invention may be considered in view of FIG. 5. An SPE 500 may be designed to fit into payload capacity 204 of a STS-1 frame 200 (see FIG. 2). SPE 500 may be comprised of one column of path overhead 502, three columns of block overhead 504 and 83 columns of payload 506 from a single tributary. Note that any given row of SPE 500 includes both overhead (path in column 502 and block in column 504) and payload (in column 506). Note also that path overhead column 502 corresponds to path overhead column 206 (FIG. 2).

Figure 6:
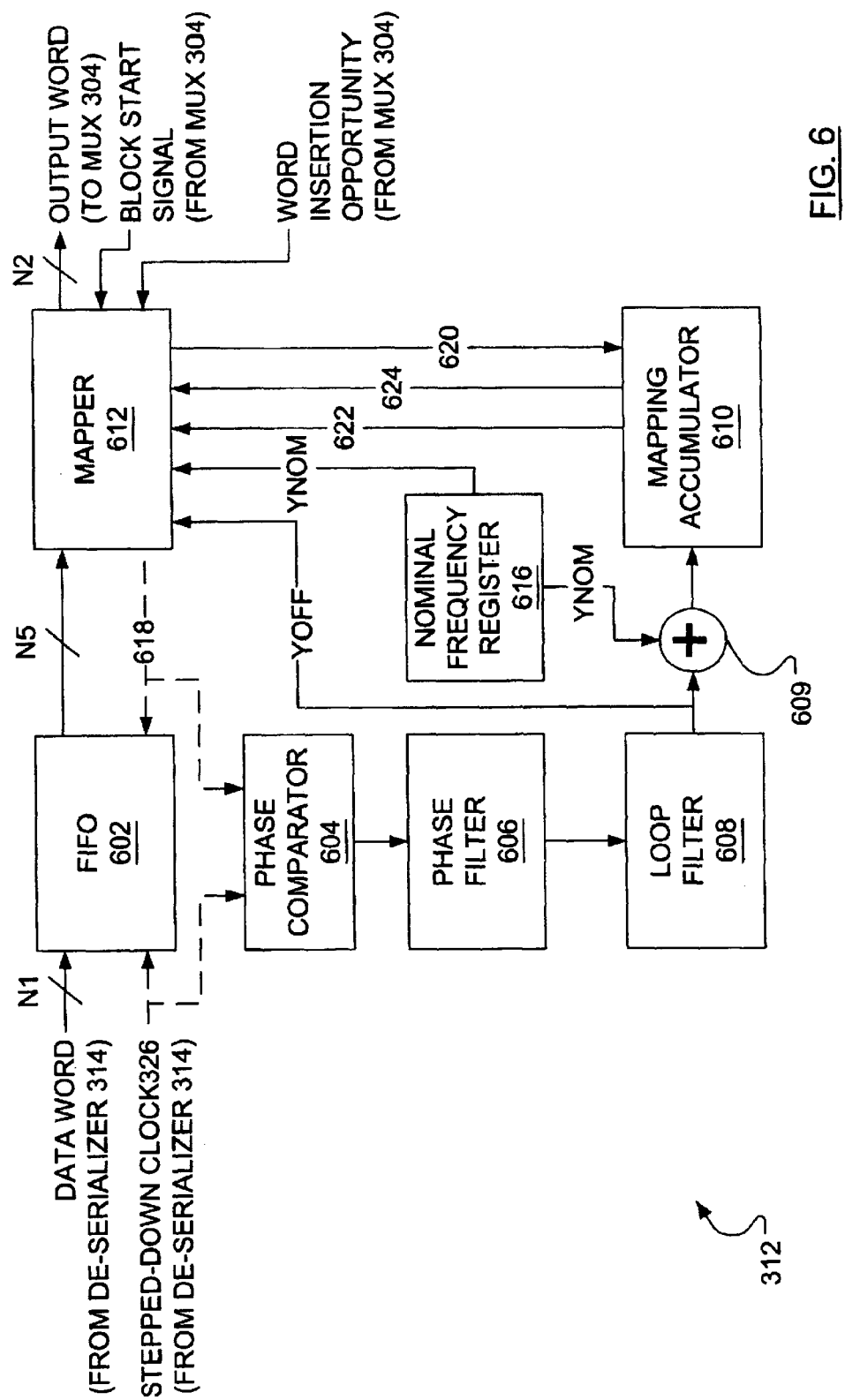
FIG. 6 is a schematic illustration of an ingress mapper for use in the near end of FIG. 3 in accordance with an embodiment of the present invention.

Interconnections of components comprising ingress mapper 312 (FIG. 3) are illustrated in FIG. 6. A FIFO (first-in-first-out buffer) 602 receives input from de-serializer 314 including data words and a stepped-down clock which indicates to FIFO 602 the timing of the incoming data words. Data words are output from FIFO 602 to a mapper 612 with timing determined by a "ready for new word" timing signal 618 received from mapper 612. "Ready for new word" signal 618 is essentially a gapped clock signal, with an overall rate similar to the rate of the stepped-down clock. Any difference between the timing of the data words input to FIFO 602 and the data words output from FIFO 602 is determined by a phase comparator 604. Effectively, phase comparator 604 keeps a running value of a difference of words input to and output from FIFO 602. Periodically, say at the system clock rate, the difference value is output to a phase filter 606 as a value representative of the timing difference, herein called "phase". Filtered phase, which may a windowed average of the timing difference, calculated in a running manner at the system clock rate or, say, once per row, is passed from phase filter 606 to a loop filter 608. (The calculation may be performed once per row by virtue of the mapping counting up to the number of words in a row; the manner in which the mapper counts is described in conjunction with FIG. 9.) A frequency offset indicator ($Y_{OFF}$) is determined by loop filter 608 based on the filtered phase and this is passed to a summer 609. The output of loop filter 608 may be updated once per row of a payload envelope. A value ($Y_{NOM}$) stored in a nominal frequency register 616 is added to the frequency offset indicator by summer 609 and a "total frequency" output of summer 609 is input to a mapping accumulator 610. The value for nominal frequency is chosen so that the accumulator generates a carry at a rate nominally equal to the word rate of the input signal. The accumulator 610 will increase its output value by the total frequency input value at each byte clock cycle when enabled to do so. For an M-bit mapping accumulator 610, a carry will be generated every time the sum of the value at the input and the accumulated value exceeds $2^M-1$.

While enabled to do so by a payload insertion opportunity signal 620 from mapper 612, mapping accumulator 610 outputs to mapper 612 a data insertion flag 624 when each carry is generated by the accumulator. Mapper 612 continuously generates payload insertion opportunity signal 620 when the next word to be output to MUX 304 is payload. Mapper 612 generates a "ready for new word" timing signal 618 in synchronism with these data insertion flags 624. That is, a rising edge of "ready for new word" timing signal 618 is triggered by receipt of a high on data insertion flag 624. The output of loop filter 608 and nominal frequency register 616 are also passed to mapper 612 where they are included as block overhead in an outgoing block of data (for use in regenerating a close approximation of the tributary clock of the tributary data with which they are associated). Mapper 612 passes output words to MUX 304 when given the opportunity to do so by MUX 304 via received word insertion opportunity signals. Words output from mapper 612 make up a block such as SPE 500 (FIG. 5) that includes both payload and overhead (path, block) words.

Phase filter 606, loop filter 608, accumulator 610 and mapper 612 may be said to define a feedback loop controlling "ready for new word" signal 618 to control the output of phase comparator 604.

Figure 7:
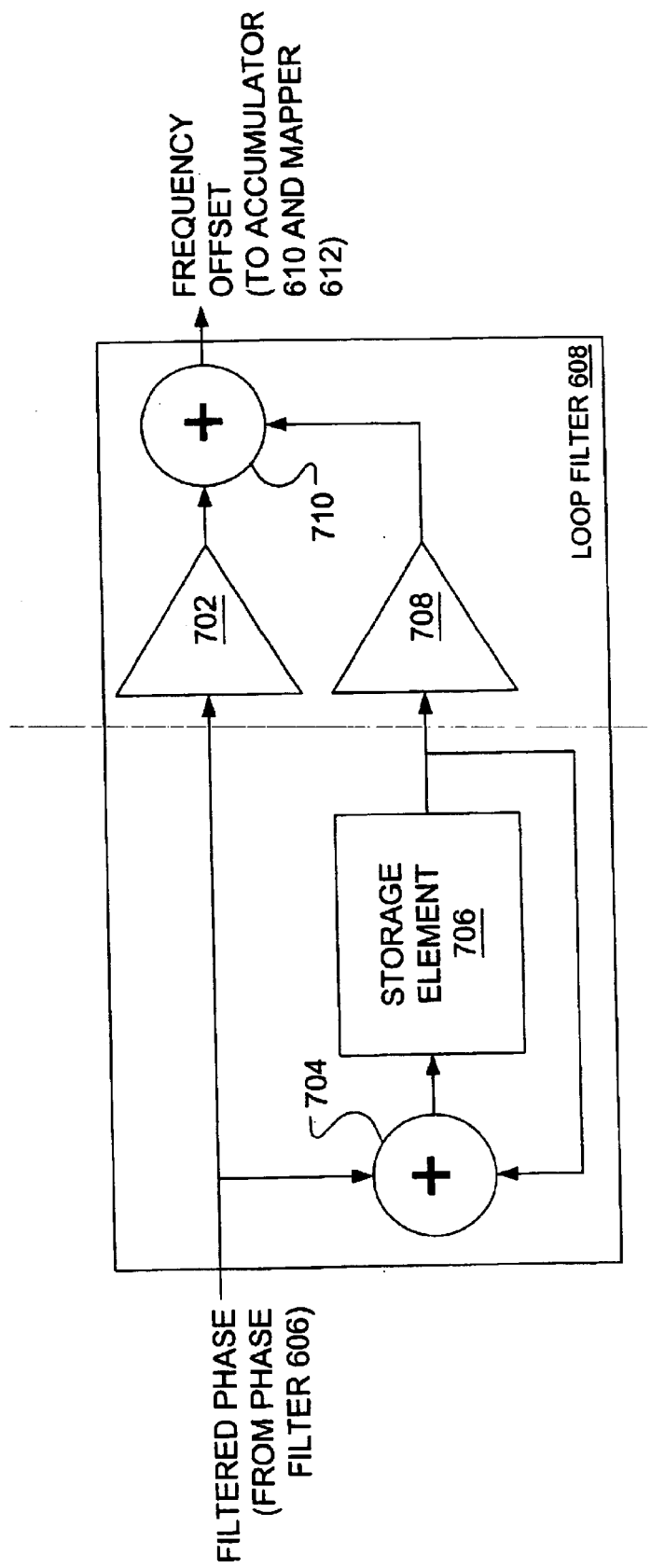
FIG. 7 is a schematic illustration of a loop filter use in the ingress mapper of FIG. 6 in accordance with an embodiment of the present invention.

The design of loop filter 608, illustrated in detail in FIG. 7, sets a dynamic response for a feedback loop defined by phase filter 606, loop filter 608, accumulator 610 and mapper 612. The dynamic response may be represented by the bandwidth and damping factor of the loop. An integration path, comprising an adder 704, a storage element 706 and an integral amplifier 708, is required in order to achieve frequency tracking with zero mean phase error while a proportional path, comprising a proportional amplifier 702, stabilizes the loop and sets the loop bandwidth. As will be apparent to a person skilled in the art, other arrangements of loop filter 608 may perform the same function.

Figure 8:
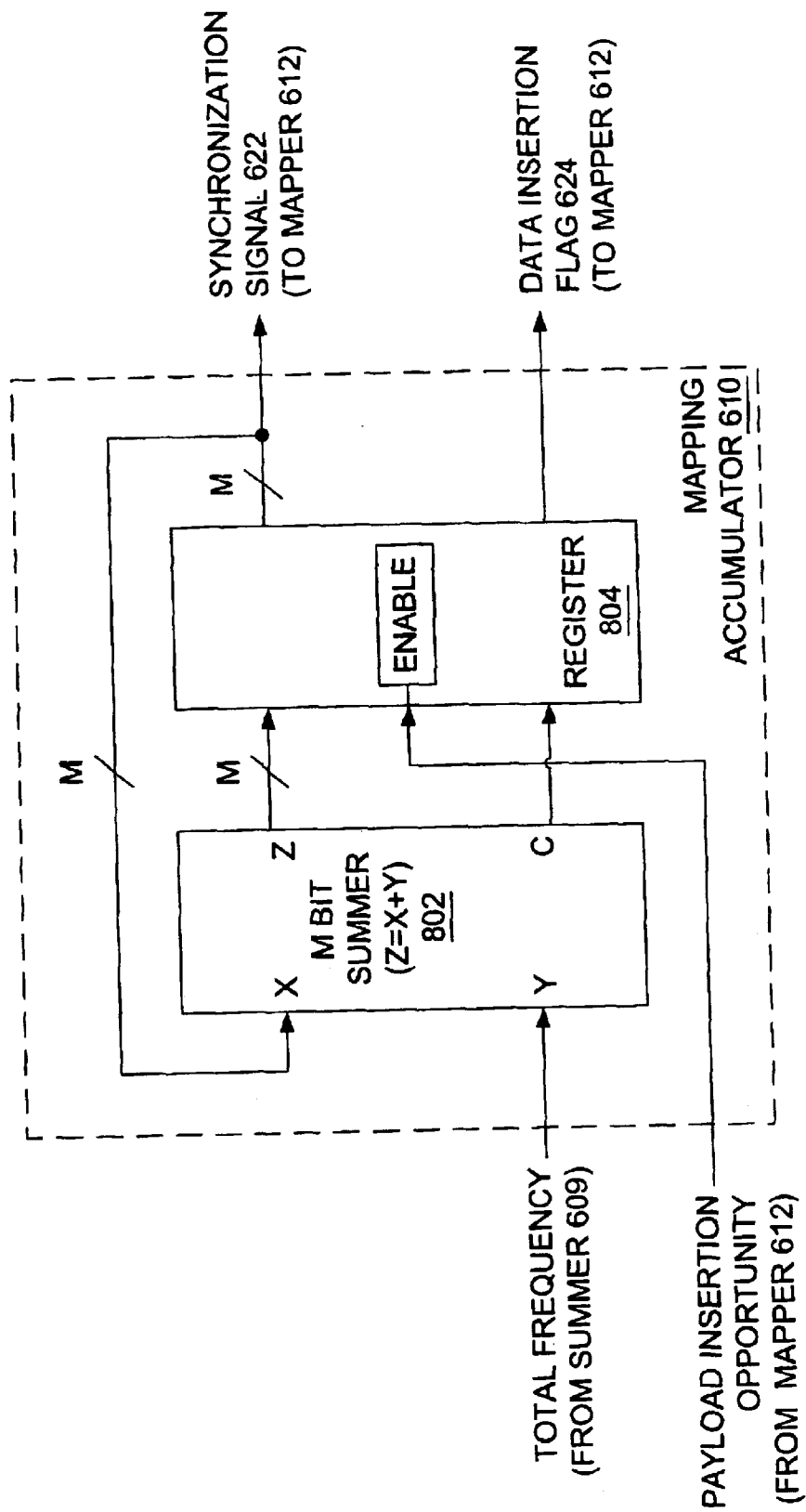
FIG. 8 is a schematic illustration of a mapping accumulator for use in the ingress mapper of FIG. 6 in accordance with an embodiment of the present invention.

Turning to FIG. 8 in conjunction with FIG. 6, the operation of mapping accumulator 610 may be examined in detail. A byte clock controls the timing of mapping accumulator 610. The byte clock frequency is the frequency at which all words (transport overhead, path overhead, block overhead and payload) are mapped to an outgoing frame of a particular format (say, STS-1). It may also be said that the byte clock frequency is the bit frequency of the format of the outgoing frame (51.84 MHz for STS-1) divided by the number of bits in a word, which is eight in the case of bytes. On each tick of the near end byte clock and while enabled, an M bit summer 802 adds a total frequency received from summer 609 and an M-bit synchronization indicator or "sync" value (X) received at X from register 804. The "sync" value represents the M bit sum in the summer 802 which was most recently stored by register 804. Output of summer 802, including M bit sum at Z and a carry bit at C, is passed to register 804 which outputs the values present at its inputs in response to payload insertion opportunity signal 620 received at an "enable" input. Register 804 outputs an M bit synchronization signal 622 and data insertion flag 624 to mapper 612. Data insertion flag 624 is a single bit taking its value from the carry bit of summer 802. As described hereinafter, passing the sync value, determined by sampling synchronization signal 622 at a specific position in the frame, to the far end allows the far end to synchronize the M bit sum in its accumulator with that in the near end accumulator. The specific position in the frame at which the sync value is determined may be arbitrarily decided upon a designer of a transmission system using the present invention. It may be, for instance, the point in time corresponding to the beginning of the first payload word in a frame.

When designing accumulator 610, the size M may be chosen arbitrarily, though a greater M leads to greater control over jitter. The value $Y_{NOM}$ stored in nominal frequency register 616, is partially determined by the size of accumulator 610 (i.e. the value of M). Also involved in the determination of $Y_{NOM}$ is near end byte clock frequency ($F_{BYTE}$). Other factors determining the value $Y_{NOM}$ include data word size (N1) and frequency of the tributary being mapped ($F_{TRIB}$). The preferred frequency with which accumulator 610 rolls over ($F_{OUT}$) may be given by $$F_{OUT} = \frac{F_{TRIB}}{N1} = F_{BYTE} \frac{Y_{NOM}}{2^M}.$$

Solving for $Y_{NOM}$ gives $$Y_{NOM} = \text{round}\left(\frac{F_{OUT}}{F_{BYTE}} 2^M\right),$$

where the "round" function rounds a real number argument to the nearest integer and is used to ensure that $Y_{NOM}$ is an integer. By way of example, consider a DS-3 tributary ($F_{TRIB}$=44.736 MHz) being mapped eight bits at a time (N1=N5=N2=8) by ingress mapper 312 with a byte clock frequency ($F_{BYTE}$) of 6.48 MHz (51.84/8 for STS-1) and a 16-bit mapping accumulator (M=16). In this example, a value of 56555 is appropriate for loading into nominal frequency register 616 for $Y_{NOM}$. However, not all words output from ingress mapper 312 are payload. Consequently, a nominal frequency number which takes into account the presence of block overhead words may be given by $$Y_{NOM} = \text{round}\left(\frac{F_{OUT}}{F_{BYTE}} 2^M \frac{A}{B}\right)$$

where A is the number of bytes per block and B is the number of payload bytes per block. Note that, as $Y_{NOM}$ must be an integer, there will normally be a difference between an ideal total frequency and $Y_{NOM}$.

Figure 9:
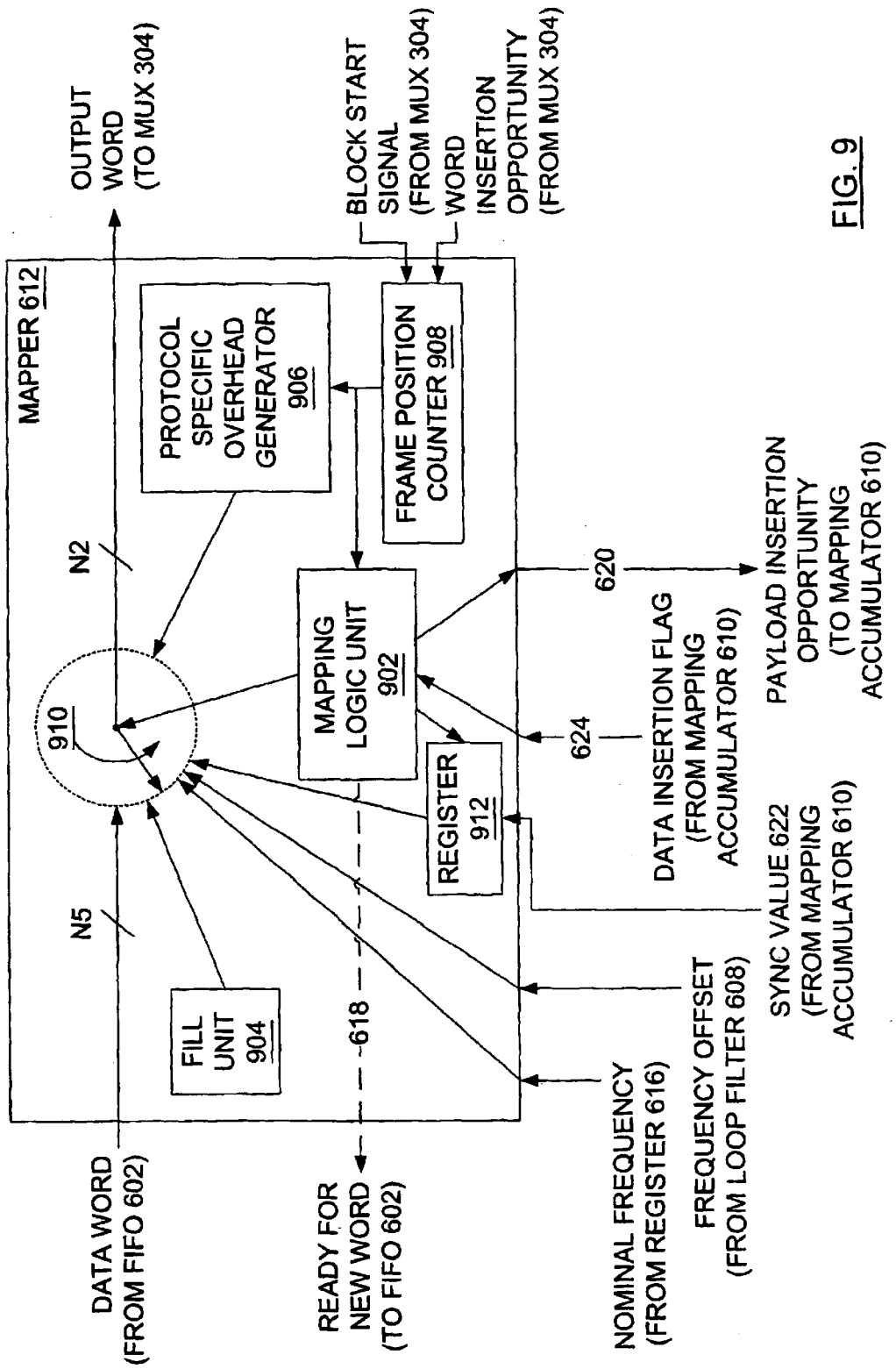
FIG. 9 is a schematic illustration of a mapper for use in the ingress mapper of FIG. 6 in accordance with an embodiment of the present invention.

The nature of words output from mapper 612 may be discussed in detail while reviewing FIG. 9, which illustrates the inter-relation of components of mapper 612, in conjunction with FIGS. 3 and 6. An indication of the start of a block (SPE) is received at a frame position counter 908, from MUX 304. Frame position, maintained by counter 908 based upon subsequently received word insertion opportunity signals, also received from MUX 304, is passed to both a protocol specific overhead generator 906 and a mapping logic unit 902. Mapping logic 902 uses the received frame position to control a switch 910 to determine the type of each output word set to MUX 304. Input to switch 910 includes data words from FIFO 602, fill data from a fill unit 904, a value from nominal frequency register 616, a frequency offset indicator from loop filter 608, a sync value from a register 912 and overhead data from protocol specific generator 906.

When, according to the frame position output from counter 908, mapper 612 is to map an overhead word to the output, mapping logic unit 902 controls payload insertion opportunity signal 620 to disable updates to accumulator 610. Conversely, when, according to frame position output from counter 908, mapper 612 is to map a payload word to the output, mapping logic unit 902 controls payload insertion opportunity signal 620 to enable updates to accumulator 610. In the latter case, when a word insertion opportunity signal is received from MUX 304 and data insertion flag 624 indicates that data should be inserted, a "ready for new word" signal 618 is sent to FIFO 602 from which is received a word of data then mapped to the output. However, when a word insertion opportunity signal is received from MUX 304, and data insertion flag 624 does not indicate that data should be inserted, a fill word from fill unit 904 is mapped to the output. Mapping logic unit 902 also controls register 912 to sample sync value 622 at specific position in the frame. The sampled sync value is then held in register 912 so that it may be mapped into overhead.

Figure 10:
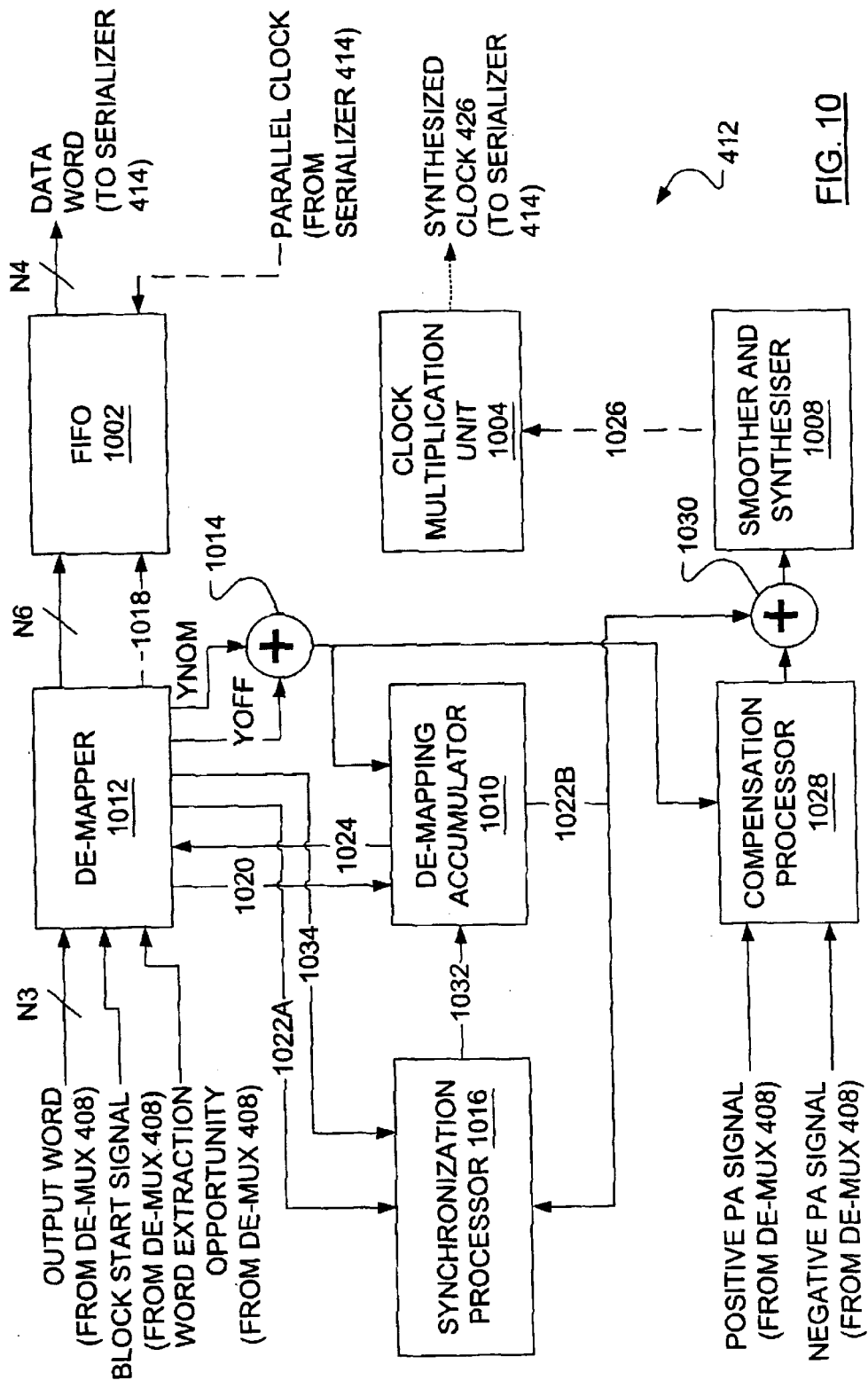
FIG. 10 is a schematic illustration of an egress de-mapper for use in the far end of FIG. 4 in accordance with an embodiment of the present invention.

The performance of components of each egress de-mapper 412 may be discussed in overview with reference to FIG. 10 and FIG. 4. Words output from DE-MUX 408 are received by a de-mapper 1012 where their type (payload, overhead) is determined. Another signal, "word extraction opportunity", from DE-MUX 408 assists de-mapper 1012 in the determination. To a FIFO 1002 de-mapper 1012 passes data words and a "ready to transfer next word" local timing signal 1018. Nominal frequency value, $Y_{NOM}$, and frequency offset indicator, $Y_{OFF}$, both extracted from overhead words received by de-mapper 1012, are sent to a frequency adder 1014 which passes the sum of the two values to a de-mapping accumulator 1010. De-mapper 1012 communicates with accumulator 1010 by way of sending a payload extraction opportunity signal 1020 and receiving a data extraction flag 1024. A M bit sync value 1022A extracted from overhead is passed from de-mapper 1012 to a synchronization processor 1016 where it is compared to a local synchronization signal 1022B generated by accumulator 1010. The timing of the comparison is controlled by comparison timing signal 1034 received from de-mapper 1012. The accuracy of the timing of the comparison is maintained through the receipt, by de-mapper 1012, of a signal from DE-MUX 408 indicating the beginning of each block (SPE). If far end accumulator 1010 is synchronized with accumulator 610 (FIG. 6) at the near end, synchronization processor 1016 will find no differences. However, any differences that are discovered may be corrected through a correction signal 1032 passed from processor 1016 to accumulator 1010. A compensation processor 1028 receives pointer adjust signals from DE-MUX 408 and a total frequency (nominal frequency value added to frequency offset indicator) from frequency adder 1014. The output from compensation processor 1028 is a sync offset added, at a sync adder 1030, to local synchronization signal 1022B at the output of accumulator 1010. The output of sync adder 1030 is passed to a smoother and synthesizer 1008. To achieve a reproduction of the original tributary clock, a stepped-down clock signal 1026 output from smoother and synthesizer 1008 is passed to a clock multiplication unit 1004 that outputs serial clock 426 to serializer 414. FIFO 1002 receives from serializer 414 a parallel clock which latches out new data words.

Note that, optionally, $Y_{NOM}$ may not be extracted from an incoming payload envelope, rather, a register within de-mapper 1012 may be pre-loaded with a value for $Y_{NOM}$, determined ahead of time given knowledge of the tributary signal format. Note further that by using direct clock synthesis at the far end rather than using an asynchronous PLL similar to that at the ingress, a common source of jitter is avoided.

As an SPE may not necessarily start at the beginning of the payload area of a frame, provisions exists for a pointer in transport overhead that indicates the position within a frame of the start of a particular SPE. As the frame passes through transitions on the path from sending end to receiving end, timing offset may dictate that the position of the start of a SPE be shifted forward or back by a byte within payload capacity 204 (FIG. 2). It is this pointer adjustment that DE-MUX 408 may be designed to recognize. As an SPE that arrives one word sooner or later can result in transients in local synchronization signal 1022B at the output of accumulator 1010, there exists a necessity to address these phase transients. Preferably, egress de-mapper 412 recognizes that a pointer adjustment has occurred, through the receipt of the aforenoted PA signals, compensates for the resulting synchronization error, then slowly bleeds the compensation away. The bleed rate may be, for instance, linear and strike a balance between being fast enough so that the compensation does not accumulate and slow enough that the transient rate is maximally reduced. Optimal performance can be achieved through adaptive means already known and publicized.

The phase transient compensation in de-mapper 412 is performed by compensation processor 1028. Upon receiving an indication, from DE-MUX 408, of a positive pointer adjustment, compensation processor 1028 passes a sync offset equivalent to the total frequency, received from frequency adder 1014, to sync adder 1030. Over the far end system clock cycles to follow, the sync offset is gradually reduced from the original value to zero. In the event of a received notification of a negative pointer adjustment, a negatively signed sync offset with a magnitude of the total frequency is passed to sync adder 1030 at first and then gradually the magnitude is reduced to zero.

Figure 11:
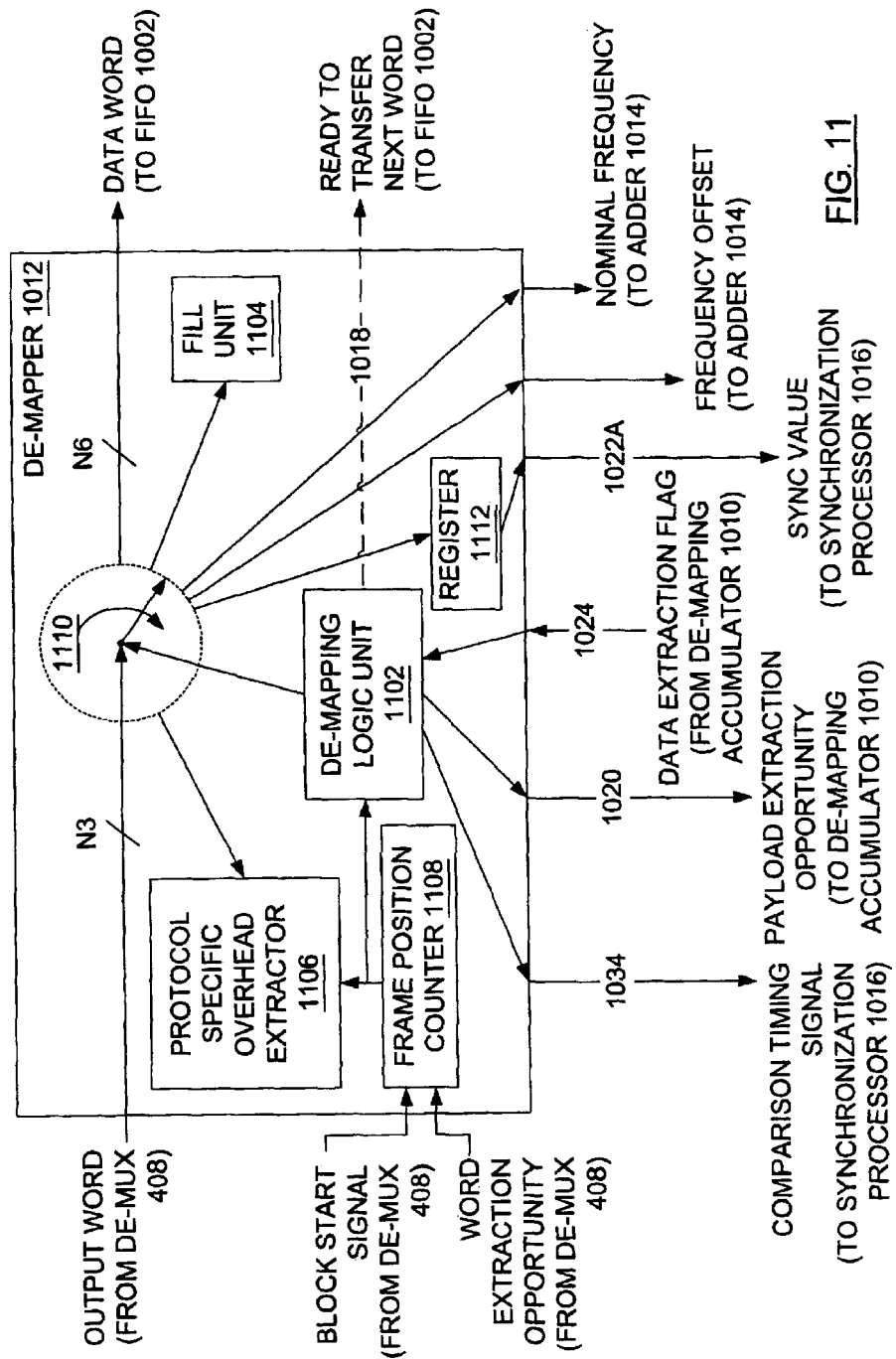
FIG. 11 is a schematic illustration of a de-mapper for use in the egress de-mapper of FIG. 10 in accordance with an embodiment of the present invention.

It should be noted that the structure of de-mapper 1012, illustrated in detail in FIG. 11, is intentionally similar to that of mapper 602 (illustrated in FIG. 9). Words output from DE-MUX 408 enter a switch 1110 which is under the control of a de-mapping logic unit 1102. Information received from a frame position counter 1108 is used to determine whether a received word is payload or overhead (path or block). Payload words may be output as data words to FIFO 1002 or as fill words to a fill unit 1104, while overhead words may be output to a protocol specific overhead extractor 1106 or as clock information to adder 1014 ($Y_{NOM}$, $Y_{OFF}$) or register 1112 (sync value X). Frame position counter 1108 receives, from DE-MUX 408, an indication of the start of each block (SPE) and a signal representative of a word extraction opportunity. From these, frame position may be determined and output to overhead extractor 1106 and de-mapping logic unit 1102. De-mapping logic unit 1102 is also in communication with accumulator 1010 indicating, through payload extraction opportunity signal 1020, that the current word is payload. If the current word is payload, de-mapping logic unit 1102 may determine whether it is a data word or a fill word by monitoring data extraction flag 1024. Generation of "ready to transfer next word" signal 1018 by de-mapping logic unit 1102 with timing from data extraction flag 1024 occurs in much the same way as generation of "read for new word" signal 618 by mapping logic unit 902 with timing from data insertion flag 624. De-mapping logic unit 1102 also indicates to synchronization processor 1016, via comparison timing signal 1034, the correct point within the frame to compare sync values.

Figure 12:
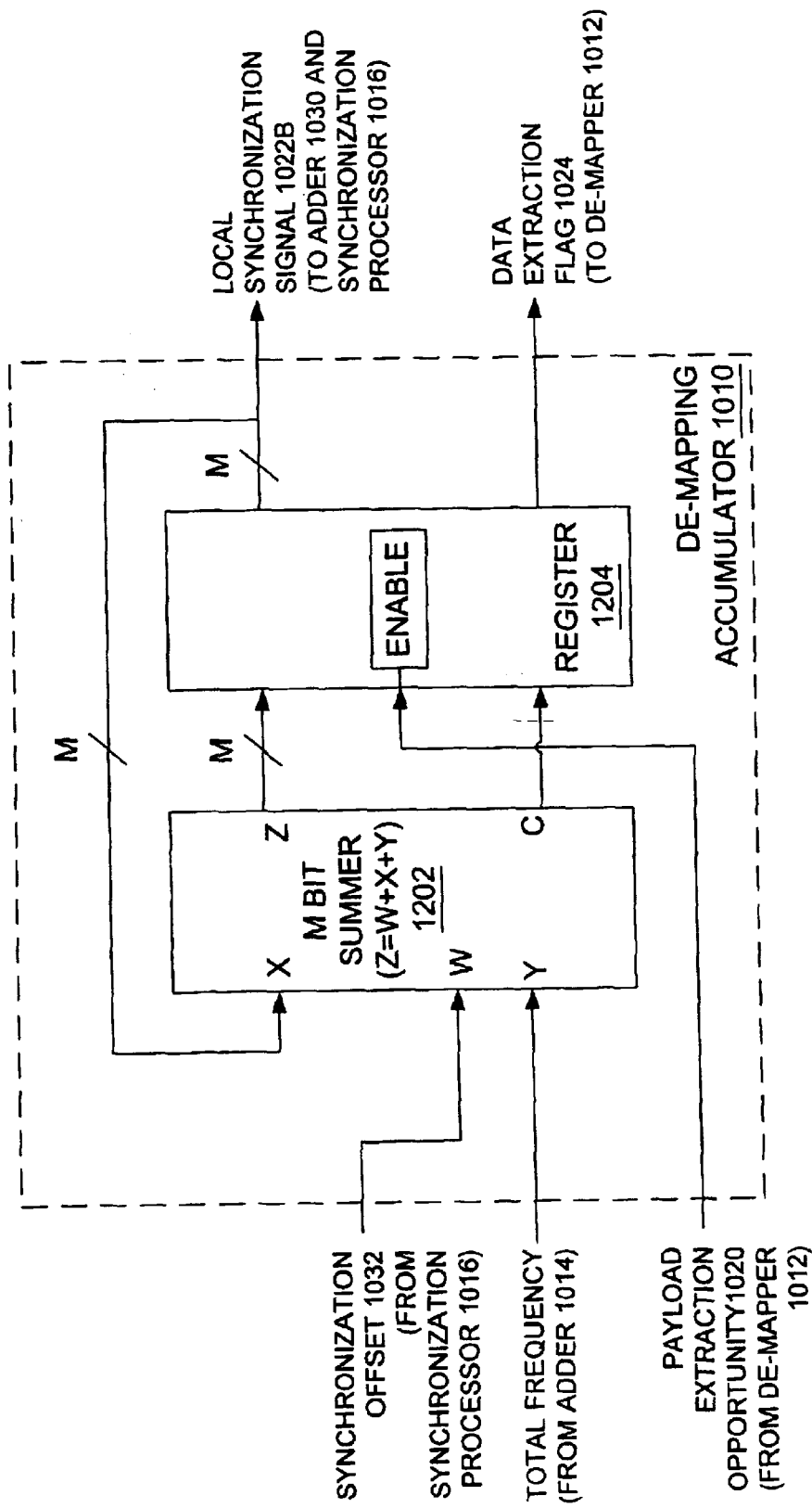
FIG. 12 is a schematic illustration of a de-mapping accumulator for use in the egress de-mapper of FIG. 10 in accordance with an embodiment of the present invention.

Turning to FIG. 12, which illustrates de-mapping accumulator 1010, at each tick of a far end system clock, an M bit summer 1202 adds a total frequency (Y) received from adder 1014 to a value (X) currently held in register 1204 and an adjustment input 1032 (W) from synchronization processor 1016. Output of summer 1202, including an M bit sum (Z) and a carry bit (C), is passed to register 1204 which outputs the values present at its inputs in keeping with an appropriate signal present at an "enable" input. Register 1024 receives a signal 1020 from mapper 1012, called a payload extraction opportunity, at the enable input. When enabled to, register 1204 outputs, to synchronize processor 1016 and adder 1030, an M bit local synchronization signal 1022B and a data extraction flag 1024. Data extraction flag 1024 is a single bit taking its value from the carry bit.

Figure 13:
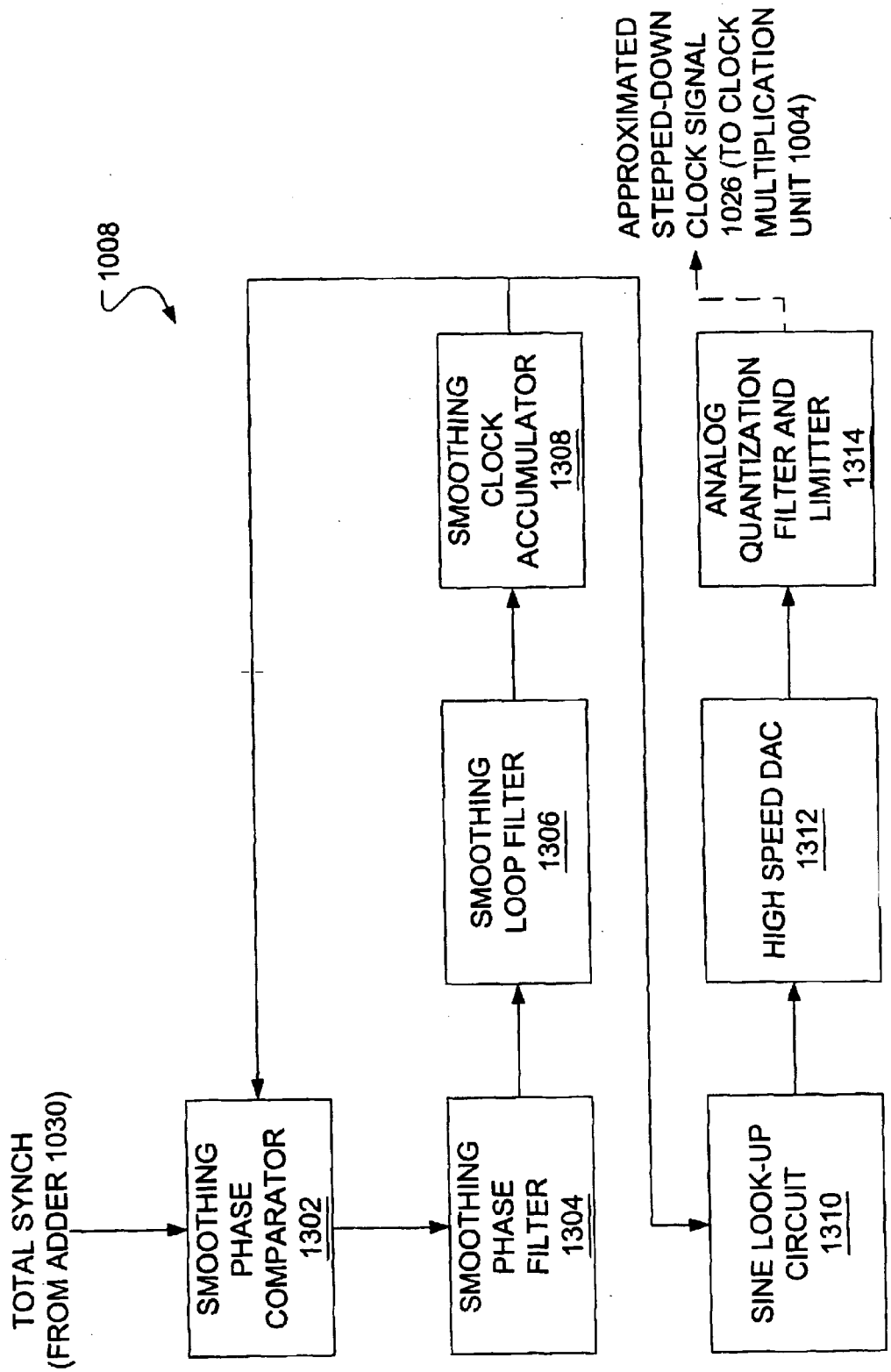
FIG. 13 is a schematic illustration of a smoother and synthesizer for use in the egress de-mapper of FIG. 10 in accordance with an embodiment of the present invention.

Smoother and synthesizer 1008, which may be examined in detail in FIG. 13, serves to smooth the output of accumulator 1010 and digitally synthesize stepped-down clock signal 1026 with the same frequency and phase as, for example, stepped-down clock signal 328A from de-serializer 314A (FIG. 3). At a smoothing phase comparator 1302, the output of a smoothing clock accumulator 1308 is subtracted from a total sync signal (sync offset+local synchronization signal 1022B) received from adder 1030. The operation of smoothing clock accumulator 1308 is similar to that of previously described accumulators 610, 1010, with the exception that a register with corresponding enable is unnecessary. This exception gives the output of smoothing clock accumulator 1308 a "free-running" quality (i.e. there are no gaps). The result of the subtraction is passed to a smoothing phase filter 1304 which outputs a running average of the difference value to a smoothing loop filter 1306 where it is used to generate a value input to smoothing clock accumulator 1308. The smoothing feedback loop, defined by smoothing phase filter 1304, smoothing loop filter 1306 and smoothing clock accumulator 1308, creates an output of smoothing clock accumulator 1308 that has a frequency approximating that of the near end stepped-down clock. The output of clock accumulator 1308 is passed back to smoothing phase comparator 1302 as well as to sine look-up circuit 1310 whose output is passed to high speed digital-to-analog converter (DAC) 1312. Sine wave like analog output from converter 1312 is received by a quantization filter and limiter 1314 where it is also limited such that a square wave is present at the output. The output 1026 of filter 1314, which is a scaled version of an approximation (in phase and frequency) of the near end stepped-down clock signal, is passed to clock multiplication unit 1004.

An example mapping of information into tributary specific overhead fields 502 of frame 500 (FIG. 5) is illustrated in FIG. 14. It can be seen in this example that a frequency offset indicator is sent in columns 2 and 3 of every row as ACCYOFFH and ACCYOOFL, the high and low word respectively. For a configuration in which $Y_{OFF}$ is represented by a 16-bit value, the high word is the eight most significant bits and the low word is the eight least significant bits. As it is crucial that $Y_{OFF}$ be received at the egress end free of errors, for the 16-bit configuration, seven bits may be used to convey $Y_{OFF}$ while the remaining nine bits are used for error detection and correction. A 15-bit code word may be used implementing a BCH(15,7) code word, where eight redundant bits allow correction of up to two errors and detection of up to three errors. The remaining bit is a simple parity bit which allows detection of any odd number of errors. Information sent in column 4 need not be updated as frequently as the frequency offset indicator. ACCYNOMH and ACCYNOML are sent once per frame and hold the high and low words of the nominal frequency value. Also sent once per frame is the output from mapping accumulator 610 (FIG. 6), the high and low words of the sync value are sent in ACCXH and ACCXL respectively, while the carry value is sent as ACCXCARRY. As is the case with $Y_{OFF}$, it is necessary to ensure reliable reception of $Y_{NOM}$ and sync values at the egress. The suggested method, common in similar communication schemes, it to wait for a number of received samples to agree before proceeding. As will be apparent to a person skilled in the art, the organization of the block overhead words is not limited to the above.

A potential drawback of the method of synchronizing the ingress and egress accumulators outlined above is that there will be gaps, occurring when overhead is being mapped, in which no updates to the accumulator occur. This causes a problem at the egress as follows. Under normal operating conditions, de-mapping accumulator 1010 mimics mapping accumulator 610 (FIG. 6) and phase information determined at the ingress is preserved. However, the typically saw-tooth output of de-mapping accumulator 1010 will have plateaus during periods where register 1024 (FIG. 12) is not enabled. Thus, accumulator 1010 may not be used to directly drive sine look-up circuit 1310 (FIG. 13) and DAC 1312 (FIG. 13), rather an intermediate stage, smoothing filter 1304 (FIG. 13), smoothing loop filter 1306 (FIG. 13) and smoothing clock accumulator 1308 (FIG. 13), must smooth out local synchronization signal 1022B. In an arrangement wherein the gaps are removed, the intermediate stage (smoothing filter) may be eliminated. Note, however, that phase filter 1304 (FIG. 13) may nevertheless be necessary or beneficial for filtering jitter from other sources. A method to regenerate a clock using a non-gapped accumulator follows.

Figure 15:
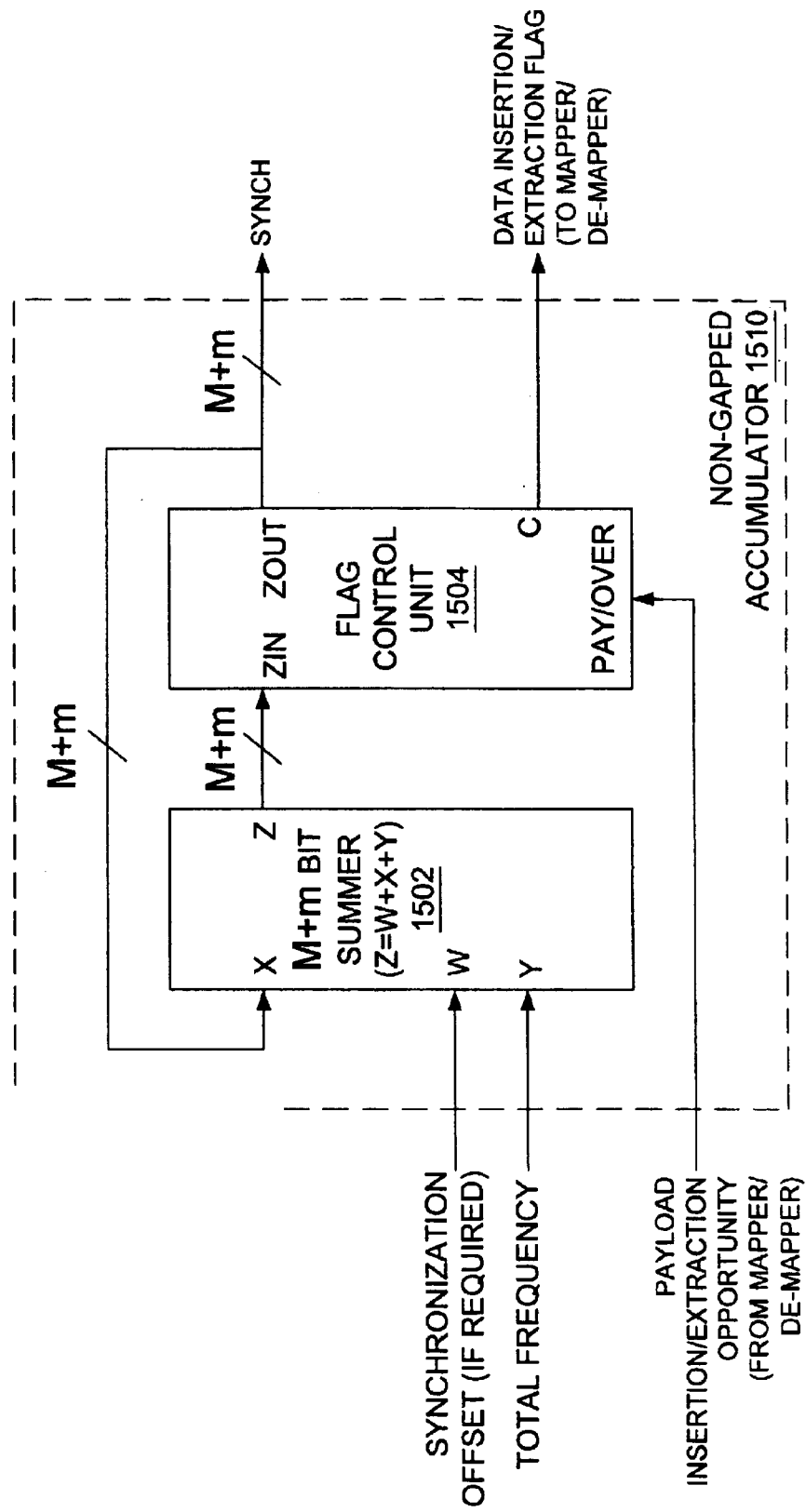
FIG. 15 is a schematic illustration of a generic non-gapping accumulator for use in the ingress mapper of FIG. 6 and the egress de-mapper of FIG. 10 in accordance with an embodiment of the present invention.

Turning to FIG. 15, consider a non-gapped accumulator 1510. Note that the inputs and outputs of non-gapped accumulator 1510 are the same as for accumulators 610 (FIG. 8) and 1010 (FIG. 12). However, unlike accumulators 610 and 1010, non-gapped accumulator 1510 is designed not to overflow. For example, an exemplary 16 bit accumulator may be replaced by a 16+4 bit non-gapped accumulator. Non-gapped accumulator 1510 includes an M+m bit summer 1502 and a flag control unit 1504. Summer 1502 operates as known, outputting an M+m bit sum (Z) of the input signals (W, X and Y). Flag control unit 1504 receives output from summer 1502 (ZIN) and outputs an M+m bit synchronization signal (ZOUT) and a data insertion/extraction opportunity flag (C). A signal (payload insertion 620 or extraction 1020 opportunity) from the mapper 612 or de-mapper 1012 indicates to non-gapped accumulator 1510 when the current word is payload. This signal is received at a PAY/OVER input or flag control unit 1504. When the current word in a given mapper is a payload word, the value at the output of summer 1502 (Z) is checked by flag control unit 1504. IF Z is equal to or larger than a modulus value (MOD) of $2^M$, then there is a word ready for transfer and Z is reduced by the modulus value (ZOUT=ZIN-$2^M$). Further, a signal (C) analogous to the carry signal of the gapped accumulator is sent as data insertion flag 624 (FIG. 9) or data extraction flag 1024 (FIG. 11). In the exemplary 16+4 non-gapped accumulator, the modulus value (MOD) is $2^{16}$. IF Z is less than the modulus then a data insertion flag 624 (FIG. 9) or data extraction flag 1024 (FIG. 11) is not sent and consequently the current byte may be considered to be fill by the logic unit. When the current word is overhead, then non-gapped accumulator 1510 is updated, but at the mapper/de-mapper no subtraction or insertion/extraction occurs. The size of the accumulator must be sufficiently large that it is not possible for the accumulator to overflow given the longest period of non-payload words.

The result of the operation of a non-gapped accumulator is that a mapper may "remember" data insertion opportunities that pass while overhead was being mapped. Having remembered the missed opportunities, the mapper may catch up by mapping data words to output at a rate faster than they arrive at the mapper.

It may be possible to avoid sending sync values in the data frame if the remainder in the accumulator at the near end and far end is deterministic at the beginning of a data transmission, e.g. the accumulators are zeroed at the beginning of each transmission. However, any frequency differences in the near end and far end system clocks could, if large enough, be problematic. Therefore, sending of the sync values is preferred.

Other modifications will be apparent to those skilled in the art and, therefore, the invention is defined in the claims.

We claim:

1. At a near end of a transmission system, a method of mapping client data into an outgoing block, said outgoing block comprising payload words and overhead words, so as to transfer said client data and clock synchronization information associated with said client data to a far end of said transmission system, said method comprising:

receiving client words of an incoming flow of said client data;

generating fill words;

mapping said payload words into said outgoing block, where:

each of a first plurality of said payload words comprises one of said client words; and each of a second plurality of said payload words comprises one of said fill words;

adjusting a rate at which said client words are mapped such that an average number of said client words mapped is equal to an average number of said client words received;

including an indication of said rate in said overhead words; and mapping said overhead words into said outgoing block.

2. The method of claim 1 wherein said indication of said rate comprises a first value (YNOM) representative of a nominal magnitude of said rate and an indicator (YOFF) of an offset from said nominal magnitude.

3. The method of claim 2 further comprising:

detecting a difference between a number of said client words received and a number of said client words mapped; and converting said difference to said offset indicator.

4. The method of claim 3 further comprising, before said converting, filtering said difference and utilizing said filtered difference to optimize said adjusting of said rate.

5. The method of claim 2 further comprising generating a first timing signal, where said mapping said payload words into said outgoing block comprises mapping one of said first plurality of said payload words as triggered by said first timing signal.

6. The method of claim 5 wherein said adjusting said rate at which said client words are mapped comprises adjusting said first time signal.

7. The method of claim 5 further comprising:

while mapping said payload words into said outgoing block, increasing an accumulated sum in an accumulator, at each tick of a near end system clock, by a sum of said offset indicator and said nominal magnitude of said rate; and responsive to mapping one of said payload words and were said accumulated sum is greater than a pre-set amount, decreasing said accumulated sum by said pre-set amount.

8. The method of claim 7 further comprising, while mapping said overhead words into said outgoing block, increasing said accumulated sum in said accumulator, at each said tick of said far end system clock, by said sum of said offset indicator and said nominal magnitude of said rate.

9. The method of claim 7 further comprising:
responsive to said decreasing said accumulated sum, generating a flag; and
deriving said first timing signal from said flag.

10. The method of claim 7 further comprising:
determining a synchronization (sync) indicator, at a given point relative to a beginner of a data structure for said outgoing block, for use in synchronizing a second timing signal, at said far end of said transmission system, with said first timing signal; and
including said sync indicator in one of said overhead words.

11. The method of claim 10 further comprising sampling, at said point relative to said beginning of said data structure, said accumulated sum in said accumulator.

12. The method of claim 11 wherein said data structure is a SONET synchronous payload envelope.

13. The method of claim 12 further comprising storing said first value representative of said nominal magnitude of said rate.

14. The method of claim 2 further comprising:
recovering a clock signal from said incoming flow of client data;
converting said incoming flow of client data from serial bits to said client words; and
converting said clock signal to a parallel clock signal.

15. The method of claim 1 further comprising including error correction and detection information in said overhead words.

16. A mapping processor comprising:
means for receiving client words of an incoming flow of client data;
means for generating fill words;
means for mapping payload words into an outgoing block, where:
each of a first plurality of said payload words comprises one of said client words; and
each of a second plurality of said payload words comprises one of said fill words;
means for adjusting a rate at which said client words are mapped such that an average number of said client words mapped is equal to an average number of said client words received;
means for including an indication of said rate in a plurality of overhead words; and
means for mapping said plurality of overhead words into said outgoing block.

17. A mapping processor comprising:
a receiver for receiving client words of an incoming flow of client data;
a fill unit for generating fill words;
a mapping unit for:
adjusting a rate at which said client words are mapped such that an average number of said client words mapped is equal to an average number of said client words received;
including an indication of said rate in a plurality of overhead words;
mapping payload words into an outgoing block, where:
each of a first plurality of said payload words comprises one of said client words;
each of a second plurality of said payload words comprises one of said fill words; and
mapping said plurality of overhead words into said outgoing block.

18. A mapping processor operable to:
receive client words of an incoming flow of client data;
generate fill words;
map payload words into an outgoing block, where:
each of a first plurality of said payload words comprises one of said client words; and
each of a second plurality of said payload words comprises one of said fill words;
adjust a rate at which said client words are mapped such that an average number of said client words mapped is equal to an average number of said client words received;
include an indication of said rate in a plurality of overhead words; and
map said plurality of overhead words into said outgoing block.

19. A computer readable medium for providing program control to a mapping processor, said computer readable medium adapting said processor to be operable to:
receive client words of an incoming flow of client data;
generate fill words;
map payload words into an outgoing block, where:
each of a first plurality of said payload words comprises one of said client words; and
each of a second plurality of said payload words comprises one of said fill words;
adjust a rate at which said client words are mapped such that an average number of said client words mapped is equal to an average number of said client words received;
include an indication of said rate in a plurality of overhead words; and
map said plurality of overhead words into said outgoing block.

* * * * *

UNITED STATES PATENT AND TRADEMARK OFFICE
CERTIFICATE OF CORRECTION

| | |
|---|---|
| PATENT NO. | : 7,068,679 B1 |
| APPLICATION NO. | : 09/612976 |
| DATED | : June 27, 2006 |
| INVENTOR(S) | : Matthew D. Brown et al. |

It is certified that error appears in the above-identified patent and that said Letters Patent is hereby corrected as shown below:

Column 14, line 59, claim 6, delete "time" and insert therefor --timing--;

Column 15, line 14, claim 10, delete "beginner" an insert therefor --beginning--;

Column 15, line 26, claim 13, delete "12" and insert therefor --2--;

Signed and Sealed this

Twenty-fourth Day of July, 2007

JON W. DUDAS
*Director of the United States Patent and Trademark Office*